(12) United States Patent
Chi

(10) Patent No.: US 11,187,784 B2
(45) Date of Patent: Nov. 30, 2021

(54) PHASE INFORMATION EXTRACTION CIRCUIT AND METHOD THEREOF FOR OBJECT MOVEMENT DETECTION

(71) Applicant: RichWave Technology Corp., Taipei (TW)

(72) Inventor: Hsiang-Feng Chi, Taipei (TW)

(73) Assignee: RichWave Technology Corp., Taipei (TW)

( * ) Notice: Subject to any disclaimer, the term of this patent is extended or adjusted under 35 U.S.C. 154(b) by 383 days.

(21) Appl. No.: 16/368,878

(22) Filed: Mar. 29, 2019

(65) Prior Publication Data

US 2019/0361091 A1    Nov. 28, 2019

(30) Foreign Application Priority Data

May 24, 2018    (TW) .................................. 107117744

(51) Int. Cl.
| | |
|---|---|
| G01S 7/35 | (2006.01) |
| G01S 13/56 | (2006.01) |
| G01S 13/536 | (2006.01) |

(52) U.S. Cl.
CPC ............. *G01S 7/352* (2013.01); *G01S 13/536* (2013.01); *G01S 13/56* (2013.01); *G01S 7/358* (2021.05)

(58) Field of Classification Search
CPC ........ G01S 7/352; G01S 13/536; G01S 13/56; G01S 7/358
See application file for complete search history.

(56) References Cited

U.S. PATENT DOCUMENTS

| | | | |
|---|---|---|---|
| 5,151,998 A | 9/1992 | Capps | |
| 8,760,631 B2 | 6/2014 | Ritter | |
| 2007/0132630 A1 | 6/2007 | Beckner | |
| 2008/0181337 A1 | 7/2008 | Maxim | |
| 2010/0303139 A1* | 12/2010 | Arthaber | G01S 3/48 375/224 |
| 2016/0337151 A1* | 11/2016 | Fu | H04L 27/122 |
| 2018/0252807 A1* | 9/2018 | Fox | G01S 13/904 |
| 2019/0227157 A1* | 7/2019 | Culkin | G01S 7/414 |

FOREIGN PATENT DOCUMENTS

| | | |
|---|---|---|
| CN | 1128091 A | 7/1996 |
| CN | 1713537 A | 12/2005 |
| CN | 101212202 A | 7/2008 |
| CN | 1835489 B | 4/2010 |
| CN | 106133664 A | 11/2016 |
| TW | I311877 | 7/2009 |
| TW | 201444295 A | 11/2014 |

OTHER PUBLICATIONS

Himanshu Maggo, Learning electronics together, Mar. 26, 2015 http://himanshumaggo.blogspot.com/2015/03/qpsk-implementation-in-sdr.html.

* cited by examiner

*Primary Examiner* — Donald H B Braswell
(74) *Attorney, Agent, or Firm* — Winston Hsu

(57) ABSTRACT

A phase information extraction circuit includes a first mixer circuit for generating a second analog signal by mixing a carrier signal with a first analog signal generated by a transmitted signal reflected by the object, an analog-to-digital converter (ADC) coupled to the first mixer circuit for generating a first digital signal according to the second analog signal, an in-phase quadrature (I/Q) signal generator coupled to the ADC for generating a digital I signal and a digital Q signal according to the first digital signal, and a first phase acquisition unit for extracting phase information according to the digital I signal and the digital Q signal.

17 Claims, 13 Drawing Sheets

PHASE INFORMATION EXTRACTION CIRCUIT AND METHOD THEREOF FOR OBJECT MOVEMENT DETECTION

CROSS REFERENCE TO RELATED APPLICATION

This application claims priority to Taiwan Patent Application No. 107117744, filed May 24, 2018, and incorporated herein by reference in its entirety.

TECHNICAL FIELD

The present invention is related to a phase information extraction circuit, especially a phase information extraction circuit capable of extracting phase information for detecting object movement.

BACKGROUND

In the prior art, the method to detect a moving object is by using a microwave device to transmit electromagnetic (EM) wave and to detect wave reflected by the object. To extract the phase information, the conventional direct conversion with I/Q signals was adopted.

However, the prior art is not cost effective and the signal cannot be easily digitized by a single analog-to-digital converter (ADC). In addition, problems such as direct current (DC) offset, flicker noises . . . etc., which exist in the direct-conversion radio frequency (RF) frontend, cannot easily be avoided. Therefore, there is a need for a better solution to improve the technology.

SUMMARY

The embodiment discloses a phase information extraction circuit for detecting movement of an object. The phase information extraction circuit comprises a first mixer circuit used to generate a second analog signal by mixing a carrier signal with a first analog signal generated by a transmitted signal reflected by the object, an analog-to-digital converter (ADC) coupled to the first mixer circuit for generating a first digital signal according to the second analog signal, an in-phase quadrature (I/Q) signal generator coupled to the ADC for generating a digital I signal and a digital Q signal according to the first digital signal, and a first phase acquisition unit used to extract phase information according to the digital I signal and the digital Q signal. The phase information is related to the movement of the object. The I/Q signal generator comprises a first mixer unit, a filter unit and an analytic signal generator. The first mixer unit is configured to mix a first intermediate frequency (IF) reference signal and a second IF signal with the first digital signal for generating a first mixed frequency signal and a second mixed frequency signal respectively. The filter unit is configured to filter the first mixed frequency signal and the second mixed frequency signal at a frequency band to generate at least one filtered signal. The analytic signal generator is configured to generate at least one set of analytic signals according to the at least one filtered signal, the at least one set of analytic signals is related to the digital I signal and the digital Q signal.

Another embodiment discloses a phase information extraction method for detecting movement of an object. The method comprises mixing a carrier signal with a first analog signal to generate a second analog signal, generating a first digital signal according to the second analog signal, generating a digital I signal and a digital Q signal according to the first digital signal, generating phase information according to the digital I signal and the digital Q signal, and generating at least one set of analytic signals according to the at least one filtered signal. The first analog signal is generated by a transmitted signal reflected by the object. The phase information is related to the movement of the object. The at least one set of analytic signals is related to the digital I signal and the digital Q signal.

DETAILED DESCRIPTION

Figure 1:
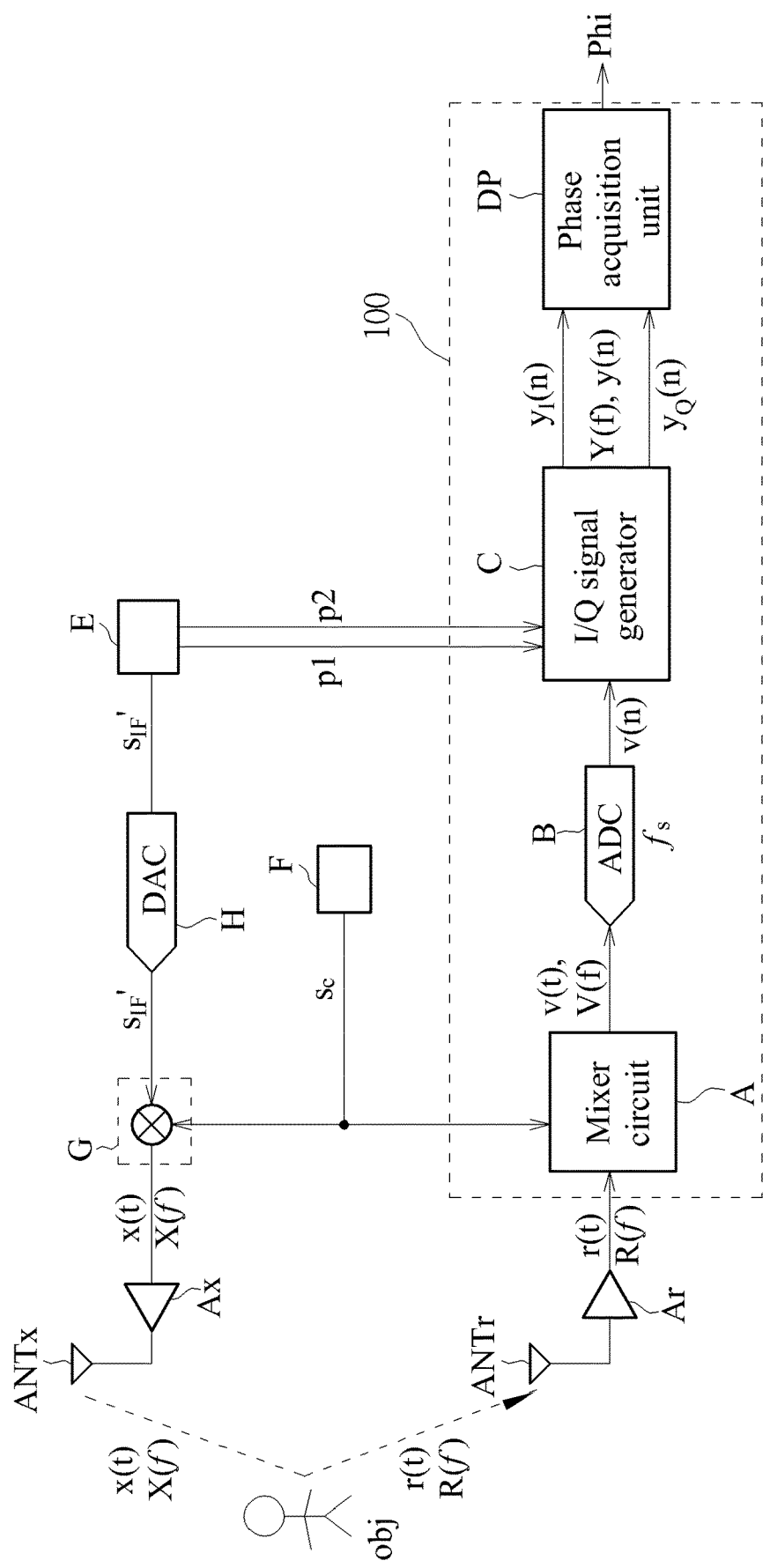
FIG. 1 is a diagram of an embodiment of the phase information extraction circuit.

FIG. 1 is a diagram of an embodiment of a phase information extraction circuit 100. FIG. 1 shows a digital-to-analog converter (DAC)H, a mixer circuit G and a transmitter antenna ANTx setting on the transmitting end and a receiver antenna ANTr, a phase information extraction circuit 100 and a digital IF quadrature signal generator E, a local oscillator F generating a high frequency carrier signal. The phase information extraction circuit 100 can detect the movement data of an object obj. For example, it can get phase information about the displacement of the object obj. The phase information extraction circuit 100 comprises a mixer circuit A, an analog-to-digital converter (ADC) B, an I/Q signal generator C, a phase acquisition unit DP. The digital IF quadrature signal generator E can be adopted to generate a first intermediate frequency (IF) reference signal p1 and intermediate frequency (IF) reference signal p2, which are related to an intermediate frequency, sent to the phase information extraction circuit 100 and to generate an IF signal $s_{IF}'$ to digital-to-analog converter (DAC) H. The reference signal generator F can be adopted to provide a high frequency carrier signal $s_c$ to the phase information extraction circuit 100 and a mixer circuit G. In one embodiment, the digital IF quadrature signal generator E could be a reference signal generator, the local oscillator F could be a reference signal generator, and the high frequency carrier signal $s_c$ could be carrier signal.

Figure 2:
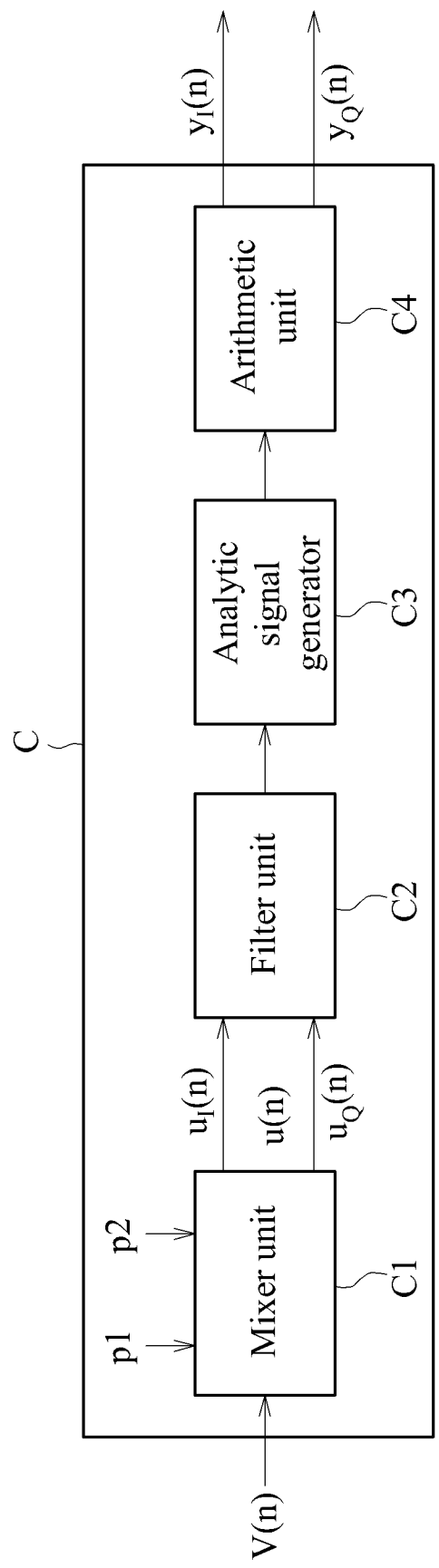
FIG. 2 is a diagram of an I/Q signal generator in FIG. 1.

FIG. 2 is a diagram of the I/Q signal generator C in FIG. 1. The I/Q signal generator C can include a mixer unit C1, a filter unit C2 and an analytic signal generator C3 and an optional arithmetic unit C4. In the embodiment, the I/Q signal generator C may or may not comprise the arithmetic unit C4.

In FIG. 1, the mixer circuit A can mix the carrier signal $s_c$ and an analog signal r(t) to generate an analog signal v(t). The analog signal r(t) in the frequency domain can be expressed as R(f) and analog signal v(t) in the frequency domain can be expressed as V(f). The analog signal r(t) is the reflection of the transmitted signal x(t) by the object obj.

In FIG. 1, the analog-to-digital converter B can be coupled to the mixer circuit A to receive the analog signal v(t) and perform analog-to-digital conversion to generate a digital signal V(n), wherein n is the discrete time index variable. The analog-to-digital converter B has a sampling rate $f_s$. In one embodiment, a single analog-to-digital converter B can be coupled to the mixer circuit A to receive the analog signal v(t) and perform analog-to-digital conversion to generate a digital signal V(n).

In FIG. 1, the I/Q signal generator C and be coupled to the ADC B so as to generate a digital I signal $y_I(n)$ and a digital Q signal $y_Q(n)$ according to the digital signal V(n). The digital I signal $y_I(n)$ and the digital Q signal $y_Q(n)$ are orthogonal to each other. The I/Q signal generator C can have a phase split function. The I/Q signal generator C can be a digital I/Q signal generator. In I/Q modulation, the digital I signal $y_I(n)$ and the digital Q signal $y_Q(n)$ can be related to the digital signal y(n) expressed as $y(n)=y_I(n)+jy_Q(n)$. The digital signal y(n) can be expressed as Y(f) in the frequency domain. The word ADC in FIG. 1 means analog-to-digital converter. The digital I signal $y_I(n)$ and the digital Q signal $y_Q(n)$ can be a baseband I/Q signal.

The phase acquisition unit DP can get phase information Phi according to the digital I signal $y_I(n)$ and the digital Q signal $y_Q(n)$, which the phase information Phi is related to the movement information of the object obj, such as displacement.

In the I/Q signal generator C, the mixer unit C1 can mix the digital signal V(n) according to the first IF reference signal p1 and the second IF reference signal p2 to generate a mixed frequency signal $u_I(n)$ and a mixed frequency signal $u_Q(n)$. The first IF reference signal p1 and the second IF reference signal p2 are IF sinusoidal signals. The filter unit C2 can filter the mixed frequency signal $u_I(n)$ and the mixed frequency signal $u_Q(n)$ at a predetermined frequency band to generate at least one filtered signal. The analytic signal generator C3 can generate at least one set of analytic signals according to the output of the filter unit C2, which the analytic signal is related to the digital I signal $y_I(n)$ and the digital Q signal $y_Q(n)$. For example, the above mentioned analytic signal can be a complex-valued function without the negative frequency component.

Figure 3:
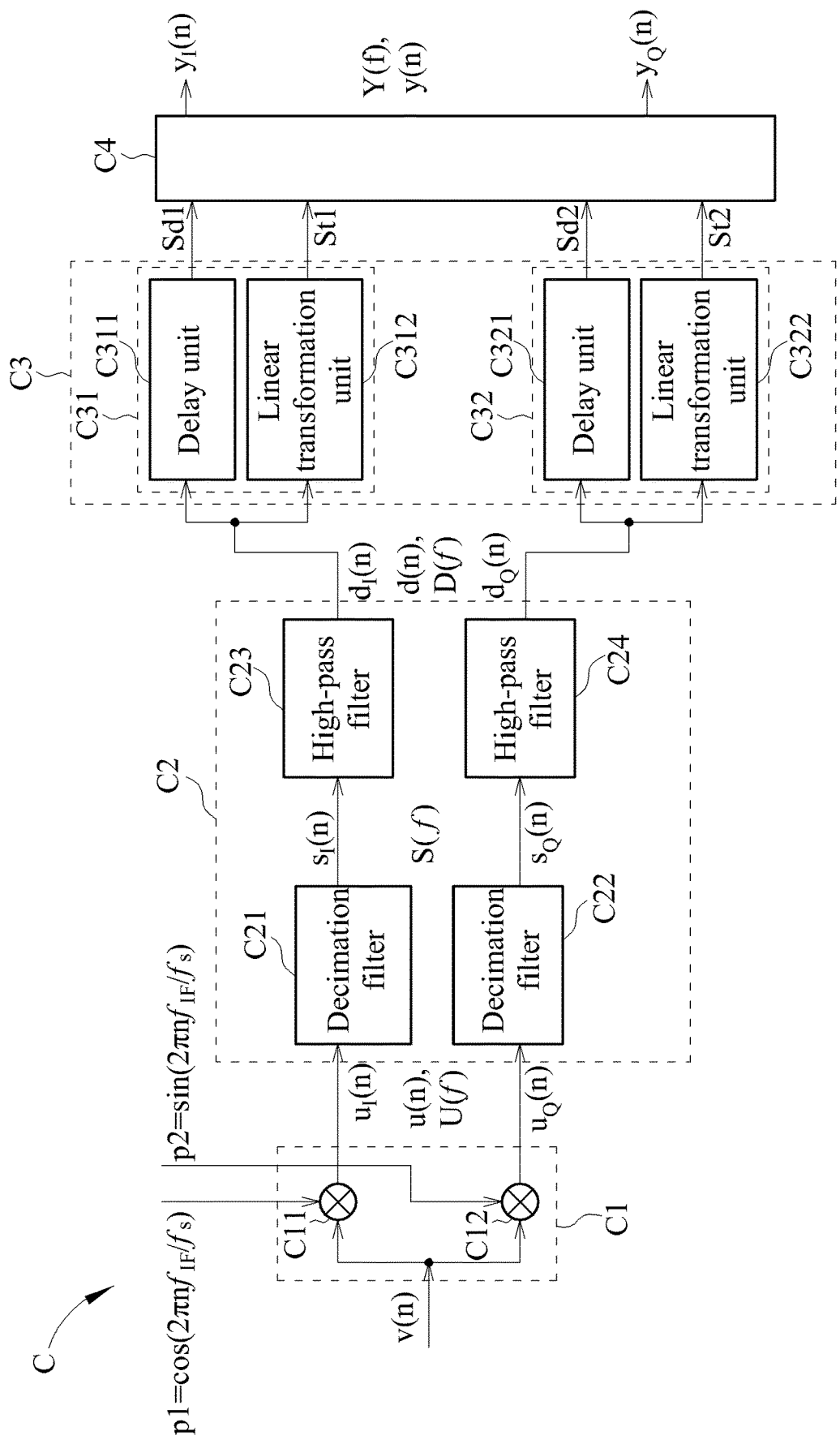
FIG. 3 is a diagram of an embodiment of the I/Q signal generator in FIG. 1.

FIG. 3 is a diagram of the I/Q signal generator C of the embodiment in FIG. 1. The I/Q signal generator C shown in FIG. 3 may be an incoherent digital I/Q signal generator.

In FIG. 3, the mixer unit C1 can mix the first IF reference signal p1 and the digital signal V(n) to generate the mixed frequency signal $u_I(n)$ and the second IF reference signal p2 and the digital signal V(n) to generate the mixed frequency signal $u_Q(n)$. The mixed frequency signals $u_I(n)$ and $u_Q(n)$ may be related to the I signal and the Q signal of the digital signal V(n) respectively. The mixed frequency signals $u_I(n)$ and $u_Q(n)$ may correspond to the signal U(f) in the frequency domain, and are usually zero-IF digital signals. The spectral signal U(f) may be expressed as u(n) in the digital time domain. According to the embodiment in FIG. 3, the mixer unit C1 comprises mixer circuits C11 and C12.

In FIG. 3, the filter unit C2 is adopted to filter the mixed frequency signals $u_I(n)$ and $u_Q(n)$ at the frequency band to generate a filtered signal $d_I(n)$ and a filtered signal $d_Q(n)$. The filtered signals $d_I(n)$ and $d_Q(n)$ may correspond to a signal D (f) in the frequency domain and to a signal d(n) in the time domain.

In FIG. 3, the analytic signal generator C3 can generate a first set of analytic signals and a second set of analytic signals according to the filtered signal $d_I(n)$ and the filtered signal $d_Q(n)$ respectively. The analytic signal generator C3 comprises an analytic signal generating unit C31 and an analytic signal generating unit C32. The analytic signal generating unit C31 can generate the first set of analytic signals, comprising a delayed signal Sd1 and a linear transformed signal St1, according to the filtered signal $d_I(n)$. The analytic signal generating unit C32 can generate the second set of analytic signals, comprising a delayed signal Sd2 and a linear transformed signal St2, according to the filtered signal $d_Q(n)$.

Figure 4:
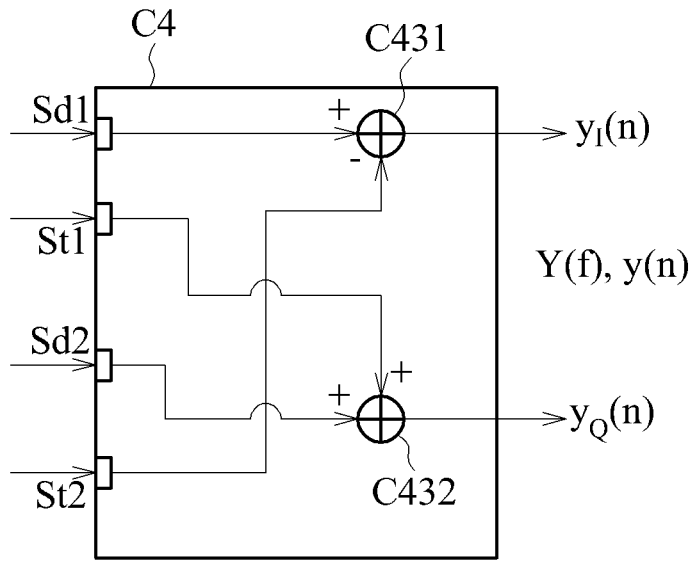
FIG. 4 is a diagram of the arithmetic unit in FIG. 2.

FIG. 4 is a diagram for an embodiment of the arithmetic unit C4 in FIG. 2. The arithmetic unit C4 comprises an adder C431 and an adder C432. The adder C431 can generate the digital I signal $y_I(n)$ according to the delayed signal Sd1 and the linear transformed signal St2. The adder C432 can generate the digital Q signal $y_Q(n)$ according to the delayed signal Sd2 and the linear transformed signal St1. According to the embodiment, the adder C431 can perform subtraction and the adder C432 can perform addition.

Figure 5:
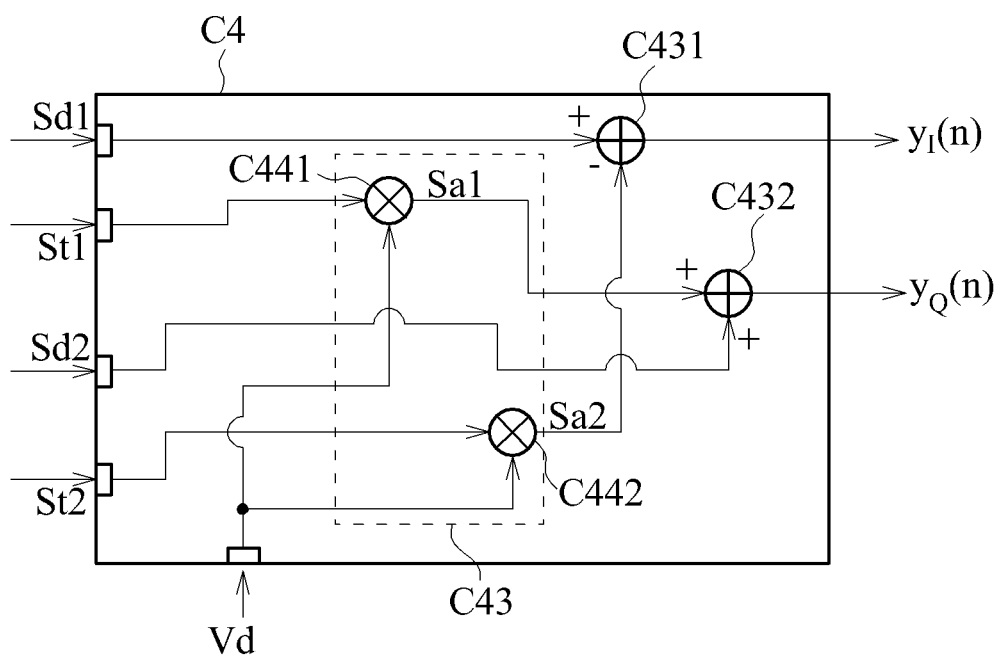
FIG. 5 is a diagram of another embodiment of the arithmetic unit in FIG. 2.

FIG. 5 is a diagram for another embodiment of the arithmetic unit C4 in FIG. 2. In FIG. 5, the arithmetic unit C4 comprises an arithmetic adjustment unit C43 for switching the polarities of the linear transformed signals St1 and St2 according to the detected velocity polarity Vd and providing the switched signals to adders C432 and C431 respectively. For example, in FIG. 5 the arithmetic adjustment unit C43 comprises mixers C441 and C442. The mixer C441 can be coupled to the analytic signal generating unit C31 to receive the linear transformed signal St1. The mixer C441 also receives the velocity polarity Vd to generate an adjustment signal Sa1 from the linear transformed signal St1 and velocity polarity Vd. The mixer C442 can be coupled to the analytic signal generating unit C32 to receive the linear transformed signal St2. The mixer C442 also receives the velocity polarity Vd to generate an adjustment signal Sa2 from the linear transformed signal St2 and velocity polarity Vd. According to the embodiment, when the object is having positive velocity, the detected velocity polarity Vd can be positive such as +1. When the object is having negative velocity, the detected velocity polarity Vd can be negative such as −1. Therefore, it can set a switch to select the velocity polarity Vd.

According to the embodiment in FIG. 2, the filter unit C2, shown in FIG. 3, comprises a low-pass filter C21 and a low-pass filter C22. The low-pass filter C21 is coupled to the mixer unit C1 to receive the mixed frequency signal $u_I(n)$ and the mixed frequency signal $u_I(n)$ can be sent through the low-pass filter C21 to generate a sampled signal $s_I(n)$. The low-pass filter C22 is coupled to the mixer unit C1 to receive the mixed frequency signal $u_Q(n)$ and the mixed frequency signal $u_Q(n)$ can be sent through the low-pass filter C22 to generate a sampled signal $s_Q(n)$. According to the embodiment, the low-pass filters C21 and C22 can have decimation filter functions and perform down-sampling, i.e. the low-pass filters C21 and C22 could be decimation filters. The down-sampling factor is M. The sampled signals $s_I(n)$ and $s_Q(n)$ correspond to the I component and the Q component respectively. The filter unit C2 in FIG. 2 can also omit the low-pass filters C21 and C22 in FIG. 3.

According to the embodiment, the filter unit C2 in FIG. 2 explained in FIG. 3 comprises a high-pass filter C23 and a high-pass filter C24. The high-pass filters C23 and C24 can be coupled to low-pass filters C21 and C22 respectively. The sampled signals $s_I(n)$ and $s_Q(n)$ can be sent through the high-pass filters C23 and C24 to generate the filtered signals $d_I(n)$ and $d_Q(n)$ respectively. The filtered signals $d_I(n)$ and $d_Q(n)$ correspond to the I component and the Q component respectively. The high-pass filters C23 and C24 can be adopted to remove the direct current (DC) portion of the signal so as to reduce the signal leakage by the direct current portion.

According to the above mentioned embodiment, the analytic signal generator C3 comprises the analytic signal generating unit C31 and the analytic signal generating unit C32. The analytic signal generating unit C31 comprises a delay unit C311 and a linear transformation unit C312 and the analytic signal generating unit C32 comprises a delay unit C321 and a linear transformation unit C322.

The delay unit C311 can delay the filtered signal $d_I(n)$ for generating and outputting a delayed signal Sd1. The linear transformation unit C312 can perform linear transformation on the filtered signal $d_I(n)$ for generating and outputting a linear transformed signal St1. The delay amount by the delay unit C311 is used to compensate the signal delay by the linear transformation unit C312. The delay unit C321 can delay the filtered signal $d_Q(n)$ for generating and outputting a delayed signal Sd2. The linear transformation unit C322 can perform linear transformation on the filtered signal $d_Q(n)$ for generating and outputting a linear transformed signal St2. The delay amount by the delay unit C321 is used to compensate the signal delay by the linear transformation unit C322. According to the embodiment, the linear transformation units C312 and C322 can be but not limited to Hilbert transform units.

According to the embodiment in FIG. 3, the first IF reference signal p1 can be $\cos(2\pi n f_{IF}/f_s)$ and the second IF reference signal p2 can be $\sin(2\pi n f_{IF}/f_s)$, which $f_{IF}$ corresponds to the intermediate frequency. The first IF reference signal p1 and the second IF reference signal p2 have a 90 degree phase shift. The intermediate frequency can be from kilohertz to megahertz.

Figure 6:
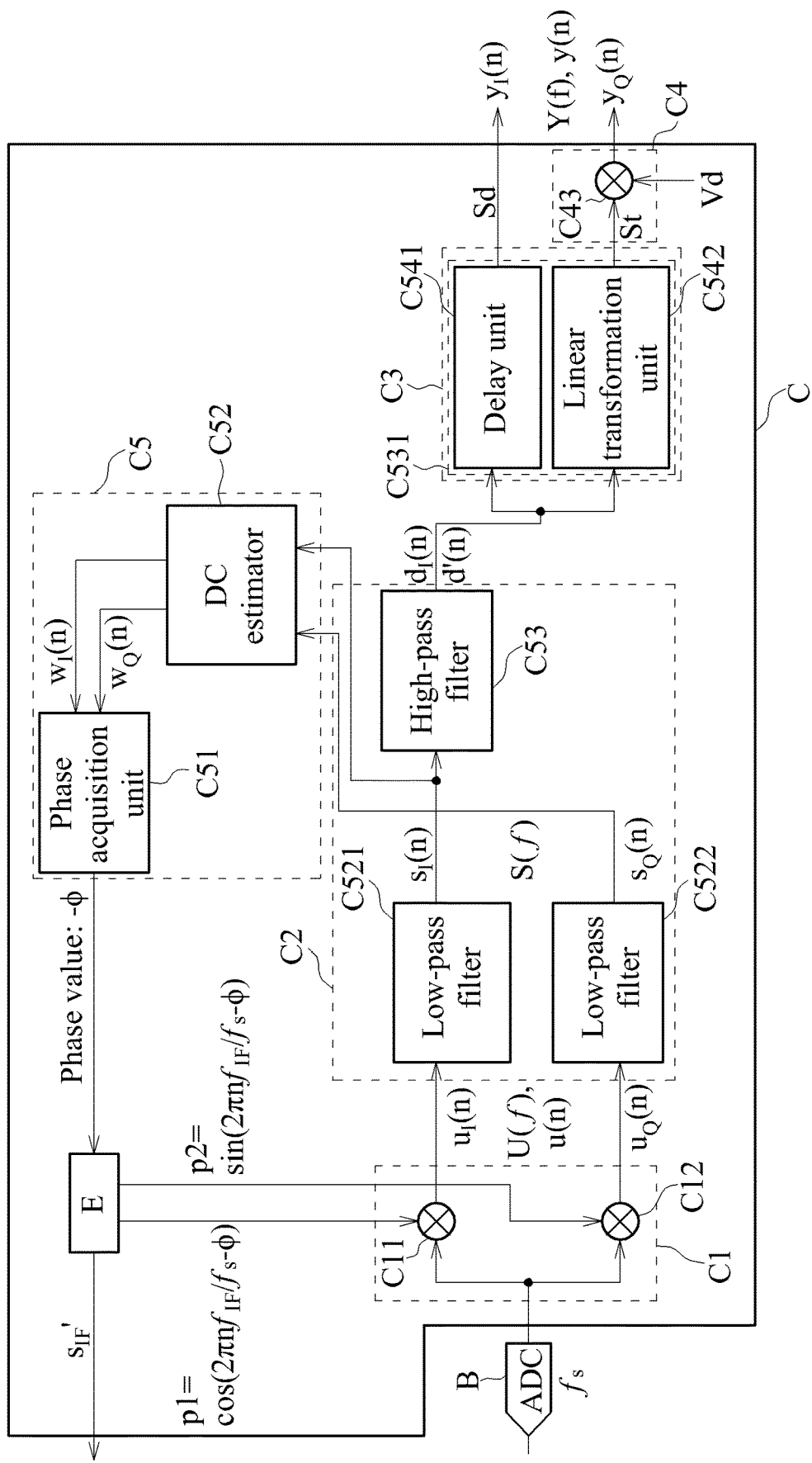
FIG. 6 is a diagram of another embodiment of the I/Q signal generator in FIG. 1.

FIG. 6 is a diagram for another embodiment of the I/Q signal generator C in FIG. 1. The I/Q signal generator C in FIG. 6 can be a coherent digital I/Q signal generator. According to this embodiment, the filter unit C2 in FIG. 6 comprises a high-pass filter C53 to generate a filtered signal $d_I(n)$ by sending the sampled signal $s_I(n)$ through the high-pass filter C53. The filtered signal $d_I(n)$ can also be expressed as d'(n).

According to the embodiment in FIG. 6, the analytic signal generator C3 comprises an analytic signal generating unit C531 to generate a delayed signal Sd and a linear transformed signal St according to the filtered signal $d_I(n)$.

According to the embodiment, the analytic signal generating unit C531 comprises a delay unit C541 and a linear transformation unit C542. The delayed unit C541 can delay the filtered signal $d_I(n)$ to generate a delayed signal Sd. The linear transformation unit C542 can perform linear transformation on the filtered signal $d_I(n)$ to generate a linear transformed signal St. The delay amount by the delay unit C541 is used to compensate the signal delay by the linear transformation unit C542. According to the embodiment, the linear transformation unit C542 can be but not limited to a Hilbert transform unit.

According to the embodiment in FIG. 6, the delayed signal Sd can be the digital I signal $y_I(n)$ and the linear transformed signal St can be the digital Q signal $y_Q(n)$.

According to the embodiment in FIG. 6, the I/Q signal generator C may further comprise an arithmetic unit C4. The arithmetic unit C4 comprises an arithmetic adjustment unit C43 to adjust the polarity of linear transformed signal St according to the detected velocity polarity Vd so as to adjust the digital Q signal $y_Q(n)$. For example, the arithmetic adjustment unit C43 can be a multiplier. When the object is having positive velocity, the detected velocity polarity Vd can be positive. When the object is having negative velocity, the detected velocity polarity Vd can be negative.

In FIG. 6, the I/Q signal generator C may further comprise a phase generator C5 to generate a phase value $-\emptyset$ according to the sampled signal $s_I(n)$ and the sampled signal $s_Q(n)$. The phase value $-\emptyset$ corresponds to the signal leakage portion. The sampled signals $s_I(n)$ and $s_Q(n)$ are related to the mixed frequency signals $u_I(n)$ and $u_Q(n)$ respectively.

In FIG. 6, the I/Q signal generator C may further comprise a reference signal generator E at the receiving end or the transmitting end, to generate the first IF reference signal p1 and the second IF reference signal p2, related to the intermediate frequency $f_{IF}$ and having phase shift $\emptyset$. It also generates the IF signal $s_{IF}'$ with the intermediate frequency $f_{IF}$ to the DAC H in FIG. 1. According to the embodiment in FIG. 6 the first IF reference signal p1 can be $\cos(2\pi n f_{IF}/f_s-\emptyset)$ and the second IF reference signal p2 can be $\sin(2\pi n f_{IF}/f_s-\emptyset)$. The first IF reference signal p1 and the second IF reference signal p2 have a 90 degree phase shift. According to the embodiment, the reference signal generator E can be comprised inside or outside the I/Q signal generator C.

In FIG. 6 the phase generator C5 may comprise a DC estimator C52 and a phase acquisition unit C51. The DC estimator C52 can generate a DC I signal $w_I(n)$ and a DC Q signal $w_Q(n)$ according to the sampled signals $s_I(n)$ and $s_Q(n)$ respectively. The phase acquisition unit C51 can generate the phase value $-\emptyset$ according to the DC I signal $w_I(n)$ and the DC Q signal $w_Q(n)$.

In FIG. 6, the leakage information can be obtained from the loop structure by the phase generator C5. It can be used to adjust the phase of the first IF reference signal p1 and the phase of the second IF reference signal p2 to minimize the DC Q signal $w_Q(n)$. In one embodiment, it could make the reflected signal by the object completely be projected on the I channel axis.

In FIG. 6, the filter unit C2 comprises a low-pass filter C521 and a low-pass filter C522. The sampled signal $s_I(n)$ can be generated by sending the mixed frequency signal $u_I(n)$ through the low-pass filter C521. The sampled signal $s_Q(n)$ can be generated by sending the mixed frequency signal $u_Q(n)$ through the low-pass filter C522. The low-pass filters C521 and C522 have decimation filter functions and can perform down-sampling. The down-sampling factor is M. The filter unit C2 in FIG. 2 can also omit the low-pass filters C521 and C522 in FIG. 6.

The below are the formulas for the embodiment. In FIG. 3 to FIG. 6, by using a continuous wave (CW) radar, the movement data of an object can be detected, such as detecting the displacement of an object to detect vital signs. The distance between the object and the receiver, such as an antenna, can be a few meters. The displacement of the moving object can be 1 to 2 cm. In one embodiment, the determined intermediate frequency is about a few hundred kHz. The signal d(n) expressed in time domain d(t) outputted by the high-pass filter in FIG. 3, and signal d'(n) expressed in time domain d'(t) outputted by the high-pass filter in FIG. 6 can be calculated as follows:

$$d(t) \approx G \cdot e^{j\phi} \cdot \cos\left(2\pi f_c \frac{2\Delta R(n)}{c} + D1\right); \quad \text{formula-1}$$

and could be expressed in frequency domain as $$d(n) \approx G \cdot e^{j\phi} \cdot \cos\left(2\pi f_c \frac{2\Delta R(n)}{c} + Fl\right) \quad \text{formula-2}$$

$$d'(t) = e^{-j\phi} \cdot G \cdot e^{j\phi} \cdot \cos\left(2\pi f_c \frac{2\Delta R(n)}{c} + D1\right) \approx$$

$$G \cdot \cos\left(2\pi f_c \frac{2\Delta R(n)}{c} + D1\right);$$

and could be expressed in frequency domain as $$d'(n) = e^{-j\phi} \cdot d(n) \approx G \cdot \cos\left(2\pi f_c \frac{2\Delta R(n)}{c} + Fl\right)$$

Wherein $f_c$ is the carrier frequency, c is the speed of light and FI is the initial phase.

D1 comprises the delay from the digital circuit of transmitting end to the transmitter ANTx, and the delay from the receiver ANTr to the digital circuit. ΔR(n) is the movement data of the object, such as displacement.

G represents the strength of the digital signal, which includes transmission power, reflection by the object, transmitter gain, receiver gain . . . etc.

$$\phi = 2\pi f_{IF}(2R(n)/c + D1) \approx 2\pi f_{IF} D1$$

The formula-1 corresponds to the incoherent circuit in FIG. 3. d(n) corresponds to the output signal of the high-pass filter.

The formula-2 corresponds to the coherent circuit in FIG. 6. d'(n) corresponds to the output signal of the high-pass filter.

If the velocity of the moving object is v=dR(t)/dt and not too small, and the polarity of the velocity is known, it can perform linear transformation, such as Hilbert transform, on a complex-value function d(n). This can be adopted on the incoherent circuit. Or it can perform linear transformation, such as Hilbert transform, on a real-number function d(n). This can be adopted on the coherent circuit. After performing the linear transformation, the following analytic signal can be generated:

$$y(n) \approx G \cdot e^{j\psi'} \cdot e^{j2\pi f_c \frac{2\Delta R(n)}{c}}; \quad \text{formula-3}$$

ψ' comprises the phase shift caused by the delay from the digital circuit of transmitting end to the transmitter ANTx and the delay from the receiver ANTr to the digital circuit.

The detected velocity polarity Vd may be estimated as:

$$Vd = \text{sign}(\text{Im}\{u^2(n) \times \text{conj}[u^2(n-1)]\}) \quad \text{formula-4};$$

u(n) is the zero-IF digital signals generated by the digital mixer C1. "sign" is the sign function. "conj" means the complex conjugate.

Therefore, the movement data of the object, such as displacement, ΔR(n) can be included in the phase value of y(n).

Figure 7:
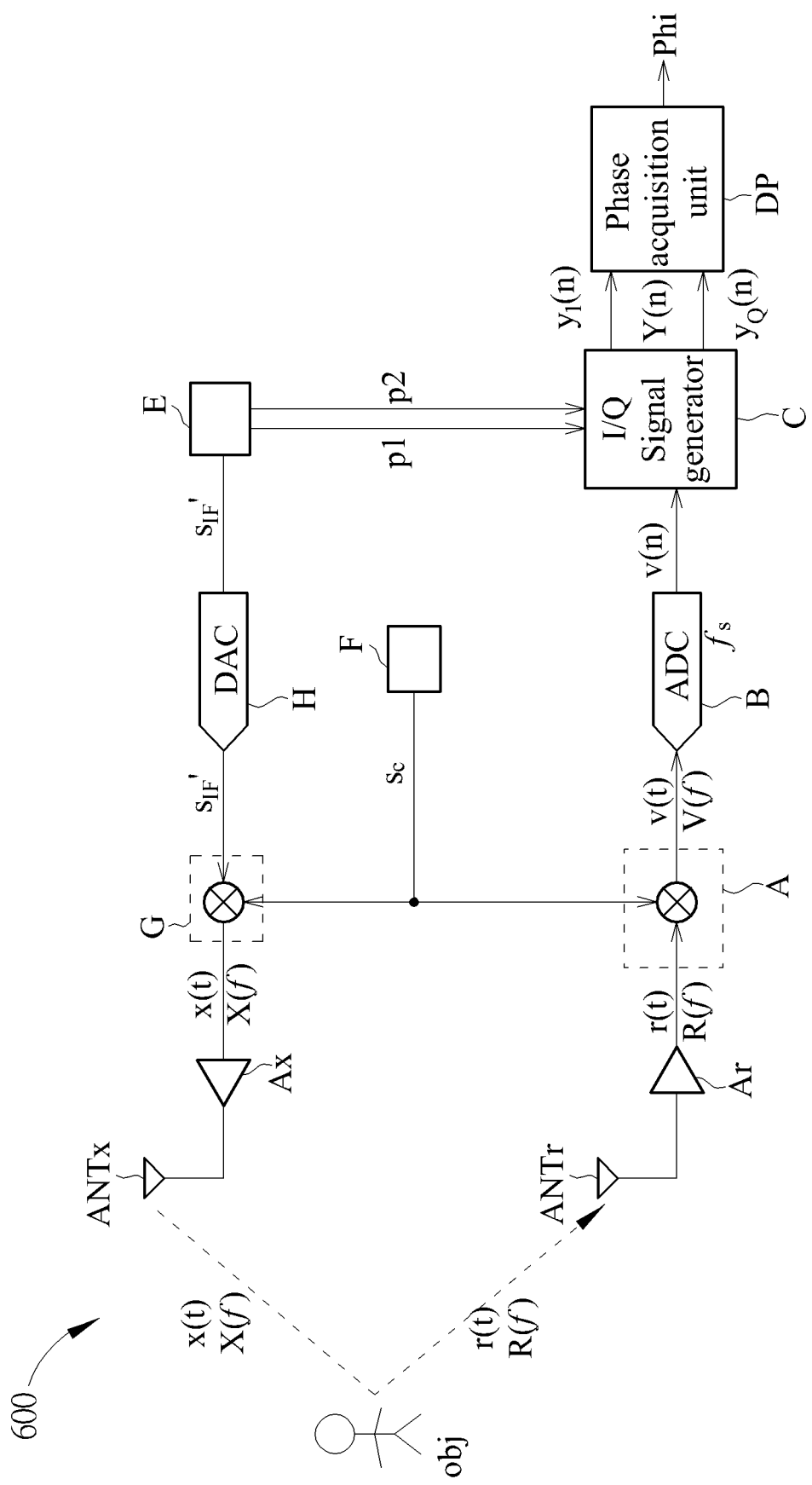
FIG. 7 is a diagram of another embodiment of the phase information extraction circuit.

FIG. 7 is a diagram for another embodiment of the phase extraction circuit 600. The phase extraction circuit 600 comprises a reference signal generator E, a mixer circuit G, a reference signal generator F, a transmitter ANTx, a receiver ANTr, a mixer circuit A, an analog-to-digital converter B, an I/Q signal generator C and a phase acquisition unit DP.

The mixer circuit A, the analog-to-digital converter B, the I/Q signal generator C and the phase acquisition unit DP are as mentioned above, so not to be described again.

According to the embodiment, the reference signal generator E can generate a first IF reference signal p1, a second IF reference signal p2 and an IF signal $s_{IF}'$ with an intermediate frequency $f_{IF}$. The first IF reference signal p1, the second IF reference signal p2 are related to the IF signal $s_{IF}'$ of frequency $f_{IF}$ shown in FIG. 1, FIG. 3 and FIG. 6. The reference signal generator F can be set on the reference end or the transmitting end.

According to the embodiment, the mixer circuit G is adopted to mix the carrier signal $s_c$ with the IF signal $s_{IF}'$ to generate transmitted signal x(t). The transmitter ANTx makes wireless transmission for the transmitted signal x(t). According to the principle of Doppler radar, the embodiment can detect the movement of the object obj. The transmitted signal x(t) can be expressed as X(f) in the frequency domain.

According to the embodiment, the phase extraction circuit 600 may comprise a digital-to-analog converter (DAC) H for converting the IF signal $s_{IF}'$ from analog to digital.

According to another embodiment, if the reference signal generator E is adopted to generate an analog signal, the DAC H in FIG. 7 could be omitted. Another DAC can be set between the reference signal generator E and the I/Q signal generator C.

According to the embodiment, an option is given to set an amplifier Ax between the mixer circuit G and the transmitter ANTx to amplify the transmitted signal x(t). Further, an option is given to set an amplifier Ar between the mixer circuit A and the receiver ANTr to amplify the analog signal r(t). The transmitter ANTx and the receiver ANT comprise antennas.

According to the embodiment, the above mentioned intermediate frequency $f_{IF}$ can be kilohertz to megahertz so that the movement of the object obj can be a small displacement. For example, it can be used to detect vital signs.

According to the embodiment, the digital parts of the phase information extraction circuit, such as the reference signal generator E, the I/Q signal generator C and the phase acquisition unit D are digital circuits. In another embodiment, the digital parts can be stored in flash memory or in one or more software modules which can be processed by a digital signal processor (DSP). In another embodiment, the digital parts can be partially digital circuits and be partially software modules processed by DSP.

Figure 8:
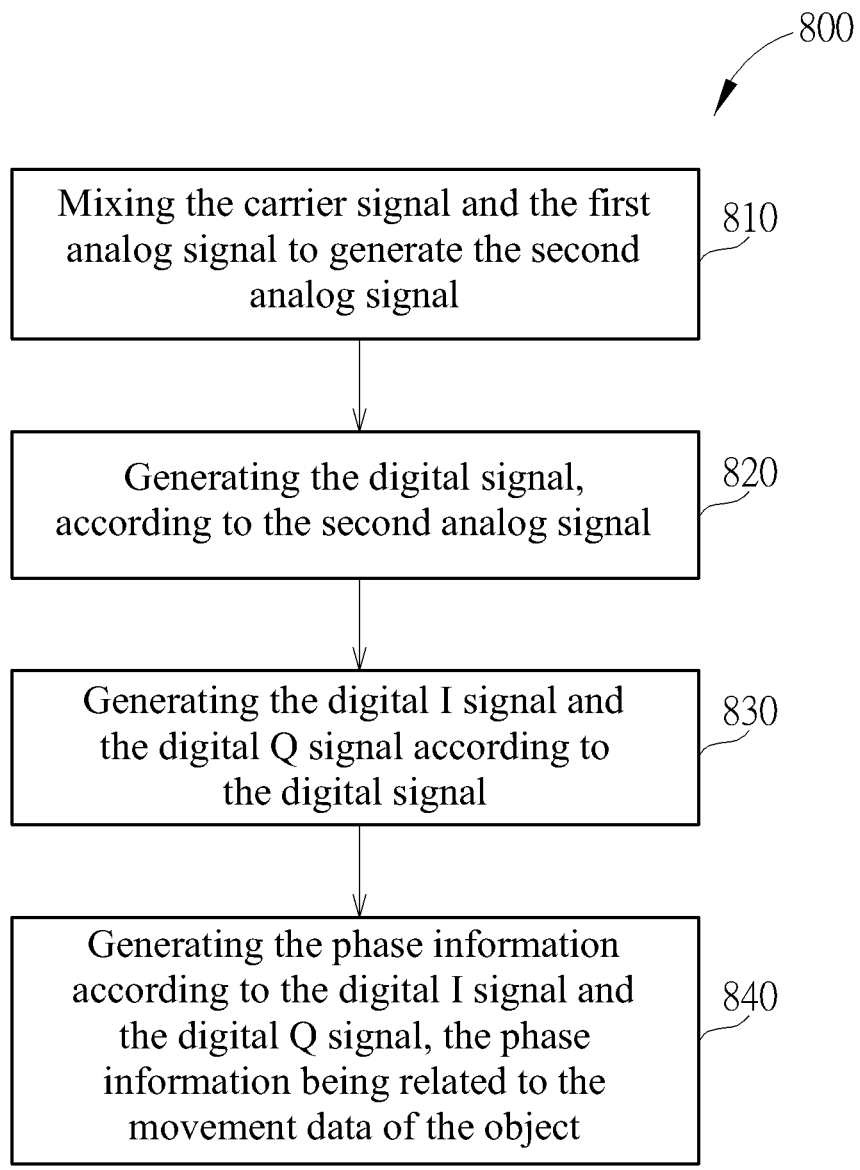
FIG. 8 is a flow chart of the method for phase extraction of the embodiment in FIG. 1.

FIG. 8 is a flow chart for the phase information extraction method of the embodiment in FIG. 1. The phase information extraction method comprises:

Step 810: mixing the carrier signal $s_c$ and the analog signal r(t) to generate the analog signal v(t), wherein the analog signal r(t) is generated by the transmitted signal x(t) reflected by the object obj;

Step 820: generating the digital signal v(n) according to the analog signal v(t);

Step 830: generating the digital I signal $y_I(n)$ and the digital Q signal $y_Q(n)$ according to the digital signal v(n);

Step 840: generating the phase information Phi according to the digital I signal $y_I(n)$ and the digital Q signal $y_Q(n)$, the phase information Phi being related to the movement of the object obj.

Figure 9:
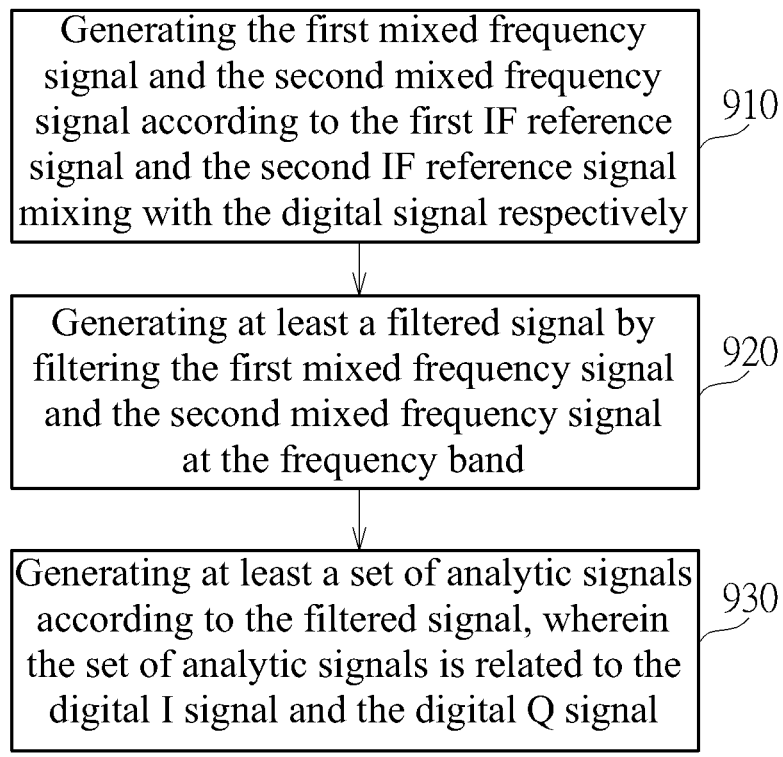
FIG. 9 is a flow chart of the method for phase extraction of the embodiment in FIG. 2.

FIG. 9 is a flow chart for the phase information extraction method of the embodiment in FIG. 2. According to the embodiment, the process of FIG. 9 can be included in step 830 in FIG. 8. FIG. 9 includes the following steps:

Step 910: generating the mixed frequency signal $u_I(n)$ and the mixed frequency signal $u_Q(n)$ respectively according to the first IF reference signal p1 and the second IF reference signal p2 mixing with the digital signal v(n);

Step 920: generating at least a filtered signal by filtering the mixed frequency signal $u_I(n)$ and the mixed frequency signal $u_Q(n)$ at the frequency band;

Step 930: generating at least a set of analytic signals according to the filtered signal. The set of analytic signals is related to the digital I signal $y_I(n)$ and the digital Q signal $y_Q(n)$.

The filtered signal in step 920 in FIG. 9 can be either one of the above mentioned filtered signals $d_I(n)$ and $d_Q(n)$. The analytic signal in step 930 can be the delayed signals Sd1 and Sd2 in FIG. 3, linear transformed signals St1 and St2 in FIG. 3 or the delayed signal Sd and linear transformed signal St in FIG. 6

Figure 10:
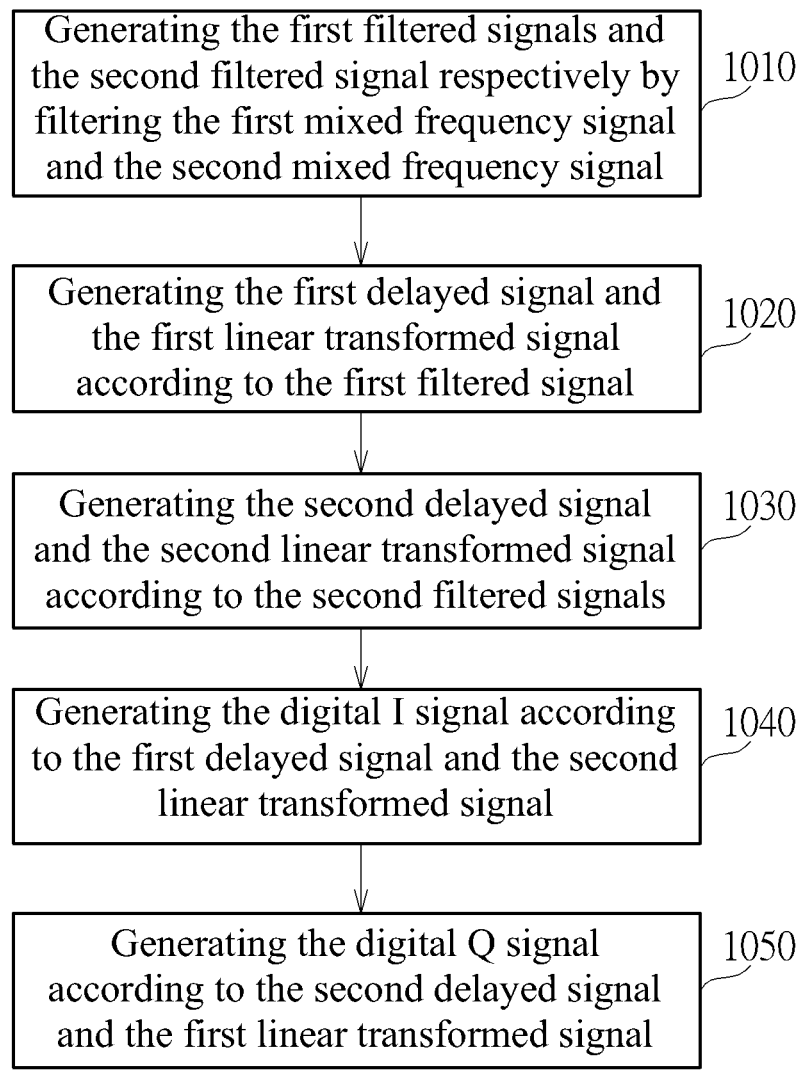
FIG. 10 is a flow chart of the method for phase extraction of the embodiment in FIG. 3.

FIG. 10 is a flow chart for the phase information extraction method of the embodiment in FIG. 3. FIG. 10 includes the following steps:

Step 1010: generating the filtered signal $d_I(n)$ and the filtered signal $d_Q(n)$ respectively by filtering the mixed frequency signal $u_I(n)$ and the mixed frequency signal $u_Q(n)$.

Step 1020: generating the delayed signal Sd1 and the linear transformed signal St1 according to the filtered signal $d_I(n)$;

Step 1030: generating the delayed signal Sd2 and the linear transformed signal St2 according to the filtered signal $d_Q(n)$;

Step 1040: generating the digital I signal $y_I(n)$ according to the delayed signal Sd1 and the linear transformed signal St2;

Step 1050: generating the digital Q signal $y_Q(n)$ according to the delayed signal Sd2 and the linear transformed signal St1.

Step 1010 corresponds to step 920 in FIG. 9. Steps 1020 to 1050 correspond to step 930. In step 1020, the delayed signal Sd1 and linear transformed signal St1 can be included in the first set of the analytic signals. In step 1030, the delayed signal Sd2 and linear transformed signal St2 can be included in the second set of the analytic signals.

Figure 11:
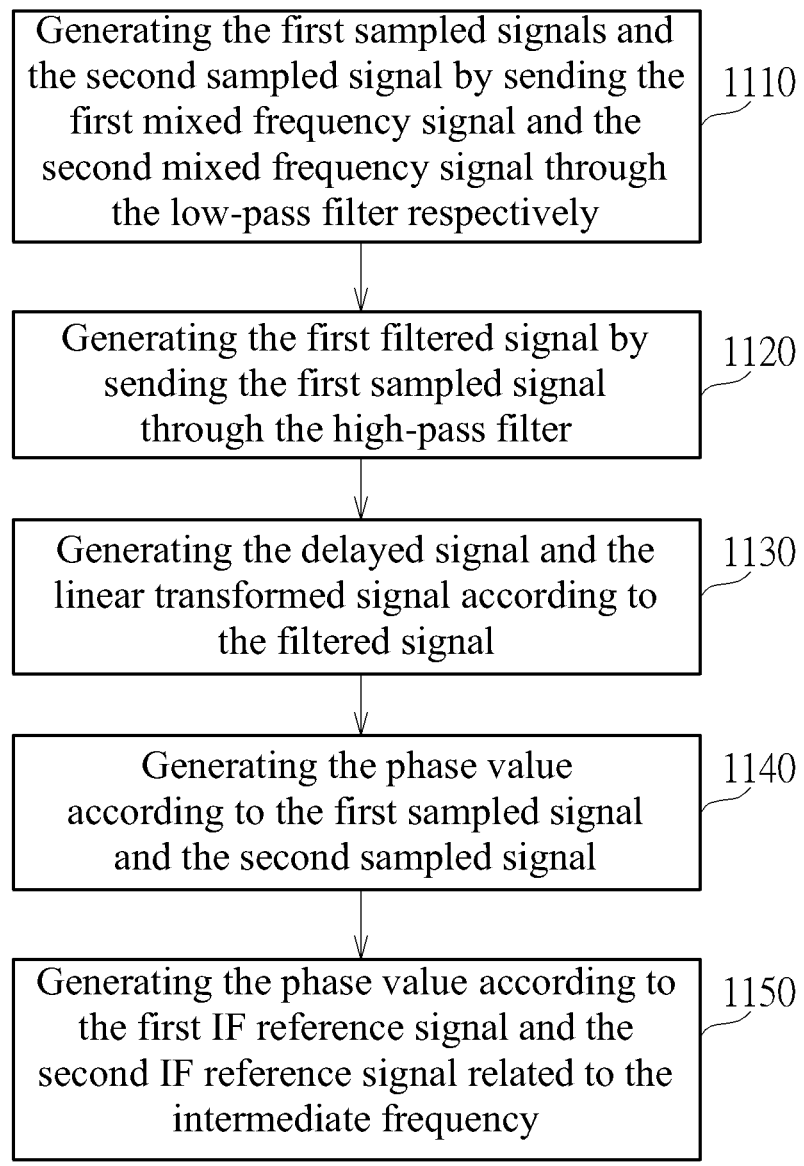
FIG. 11 is a flow chart of the method for phase extraction of the embodiment in FIG. 6.

FIG. 11 is a flow chart for the phase information extraction method of the embodiment in FIG. 6. FIG. 11 includes the following steps:

Step 1110: generating the sampled signal $s_I(n)$ and the sampled signal $s_Q(n)$ by sending the mixed frequency signal $u_I(n)$ and the mixed frequency signal $u_Q(n)$ through the low-pass filters respectively;

Step 1120: generating the filtered signal $d_I(n)$ by sending the sampled signal $s_I(n)$ through the high-pass filter;

Step 1130: generating the delayed signal Sd and the linear transformed signal St according to the filtered signal $d_I(n)$;

Step 1140: generatingthe phase value –Ø according to the sampled signal $s_I(n)$ and the sampled signal $s_Q(n)$; and Step 1150: generating the first IF reference signal p1 and the second IF reference signal p2 related to the intermediate frequency $f_{IF}$ according to the phase value –Ø.

Steps 1110 and 1120 correspond to step 920. In step 1130, the delayed signal Sd and the linear transformed signal St can be included in a set of analytic signals. Steps 1140 and 1150 correspond to the loop structure formed by the phase generator C5 in FIG. 6.

Figure 12:
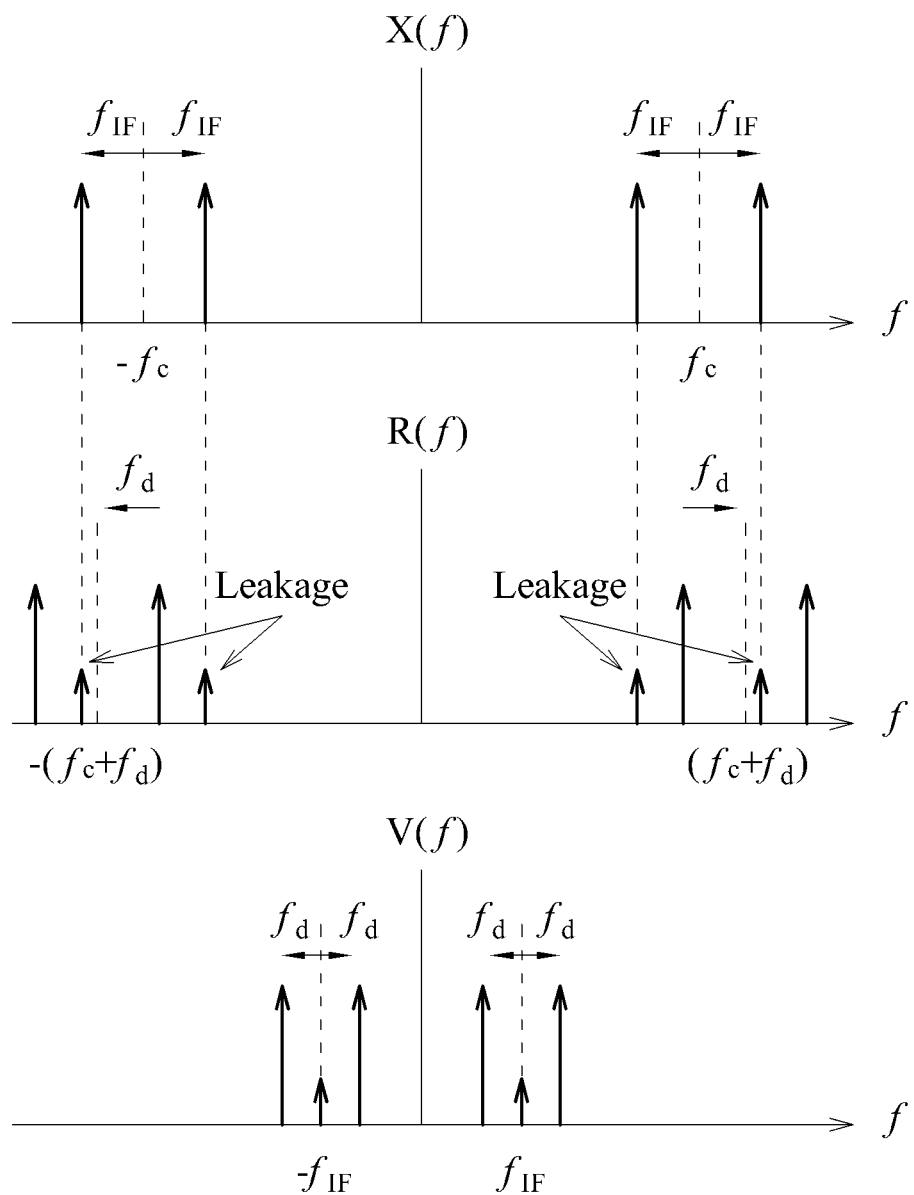
FIG. 12 is a diagram of the transmitted signal, the received signal and the analog signal in the frequency domain in FIG. 1 to FIG. 7.

FIG. 12 includes the spectral plots for the transmitted signal X(f), the received signal R(f), and the analog signal V(f) in the frequency domain in FIG. 1 to FIG. 7. As shown in FIG. 12, the transmitted signal X(f), the received signal R(f), and the analog signal V(f) can be double-sideband signals. The signal components of the transmitted signal X(f) are positioned at $(f_c \pm f_{IF})$ and $(-f_c \pm f_{IF})$. After reflecting by the object obj, the signal components of the received signal R(f) are positioned at $(f_c + f_d \pm f_{IF})$ and $(-(f_c + f_d) \pm f_{IF})$. The displacement amount of the object obj corresponds to the shifted frequency $f_d$. The frequency domain plot for the received signal R(f) also shows the leakage part of the signal components. They are the leakages between the transmitter ANTx and the receiver ANTr. After processing by the mixer circuit A, the components of the analog signal V(f) would be positioned at $(f_{IF} \pm f_d)$ and $(-f_{IF} \pm f_d)$.

Figure 13:
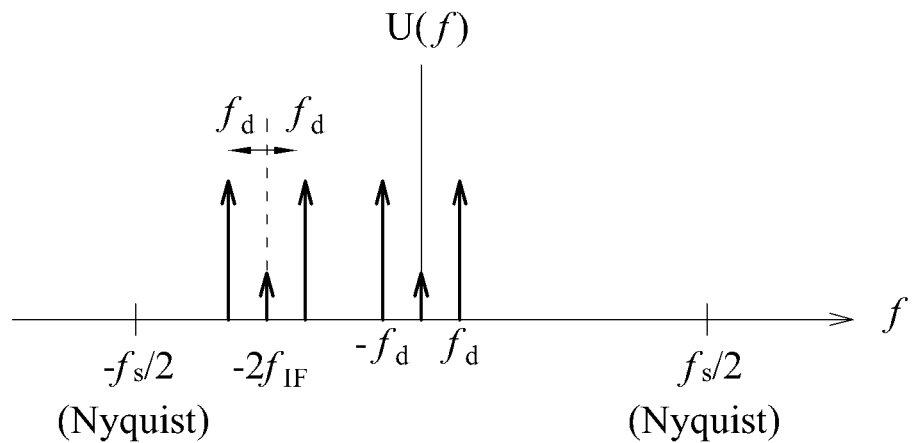
FIG. 13 is a diagram of the mixed frequency signal and the sampled signal in FIG. 3 to FIG. 6.
Figure 13:
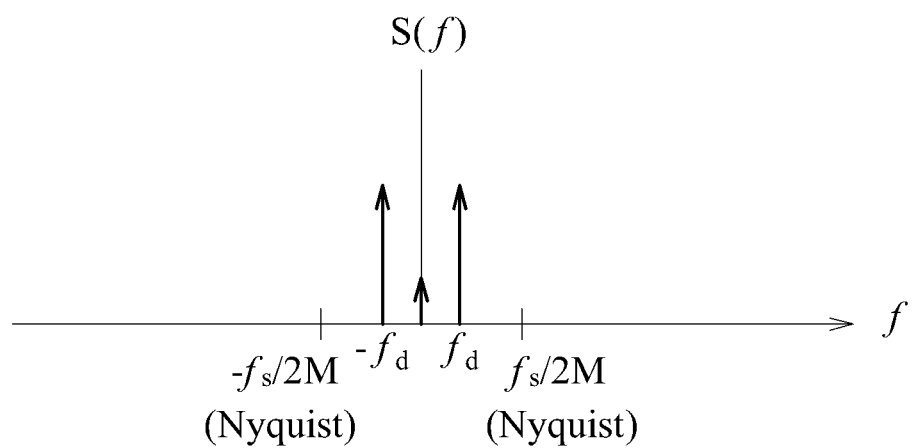

FIG. 13 includes the plots for the mixed frequency signal U(f) and the sampled signal S(f) of the embodiment in FIG. 3 and FIG. 6. As shown in FIG. 13, the components of the mixed frequency signal U(f) can be positioned at 0, $\pm f_d$ and $(-2 \times f_{IF} \pm f_d)$. The Nyquist frequency can be $(-f_s/2)$ and $f_s/2$ according to the sampling rate $f_s$ of the ADC B.

After passing through the low-pass filter and down-sampling, the signal components of the sampled signal S(f) can be positioned at 0 and $\pm f_d$. Since the down-sampling factor may be M, the Nyquist frequency may be $(-f_s/2M)$ and $f_s/2M$.

Figure 14:
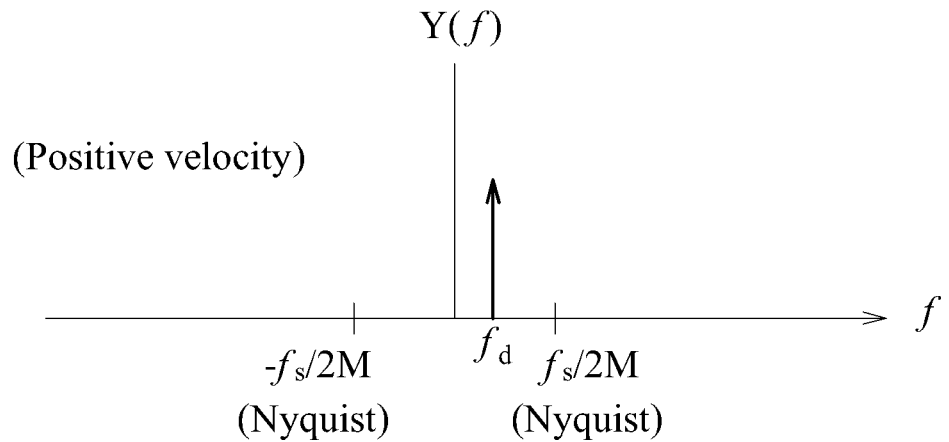
FIG. 14 is a diagram of the digital signal in the frequency domain when detecting positive velocity of an object.
Figure 15:
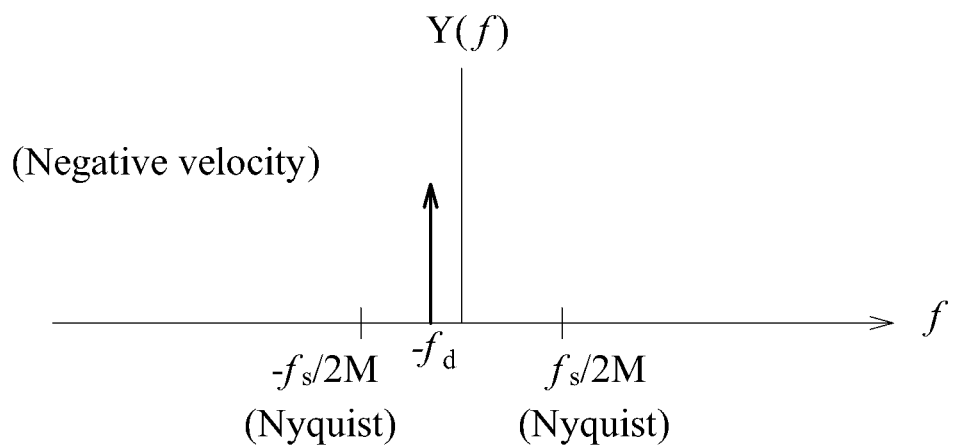
FIG. 15 is a diagram of the digital signal in the frequency domain when detecting negative velocity of an object.

FIG. 14 and FIG. 15 are the plots of the digital signal Y(f) of the embodiments in FIG. 3 and FIG. 6. FIG. 14 is the plot of the digital signal Y(f) when detecting positive velocity for the object obj. The signal components of Y(f) can be positioned at the shifted frequency $f_d$ so as to obtain the displacement and spatial information of the object obj. For the embodiment in FIG. 14, the velocity polarity Vd in FIG. 3 and FIG. 6 is positive.

FIG. 15 is the plot of the digital signal Y(f) when detecting negative velocity for the object obj. The signal components of Y(f) can be positioned at the shifted frequency $-f_d$ so as to obtain the displacement amount of the object obj. For the embodiment in FIG. 15, the velocity polarity Vd in FIG. 3 and FIG. 6 is negative.

As shown by FIG. 14 and FIG. 15, the leakage by the DC part of the signal can be removed by the high-pass filter so as to reduce the effect of leakage. Further, it can reduce DC offset and flicker noise.

In summary, the phase information extraction circuit, the phase information extraction system and the phase information extraction method for detecting movement of an object in the above mentioned embodiments, can be adopted on the digital intermediate frequency Doppler radar acquiring phase information on double sideband signals. In another embodiment, the carrier wave frequency $f_c$ can be fixed, not in the way of frequency sweeping. According to the embodiment, it can obtain phase information and include phase-split modules. It can also perform synchronous phase compensation with the intermediate frequency at the transmitting end and receiving end. According to the embodiment, it can adopt a single ADC for digitizing the signal. It can also reduce DC offset and flicker noise during object movement detection. Therefore, it improves the performance of object movement detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase information extraction circuit for detecting movement of an object, comprising:
    a first mixer circuit configured to generate a second analog signal by mixing a carrier signal with a first analog signal, wherein the first analog signal is generated by a transmitted signal reflected by the object;
    an analog-to-digital converter (ADC) coupled to the first mixer circuit and configured to generate a first digital signal according to the second analog signal;
    an in-phase quadrature (I/Q) signal generator coupled to the ADC and configured to generate a digital I signal and a digital Q signal according to the first digital signal; and
    a first phase acquisition unit configured to extract phase information according to the digital I signal and the digital Q signal, the phase information being related to the movement of the object;
    wherein the I/Q signal generator comprises:
        a first mixer unit configured to mix a first intermediate frequency (IF) reference signal and a second intermediate frequency (IF) signal with the first digital signal for generating a first mixed frequency signal and a second mixed frequency signal respectively;
        a filter unit configured to filter the first mixed frequency signal and the second mixed frequency signal at a frequency band to generate a first filtered signal and a second filtered signal respectively;
        an analytic signal generator configured to generate a first set of analytic signals and a second set of analytic signals according to the first filtered signal and the second filtered signal respectively, the first set of analytic signals and the second set of analytic signals being related to the digital I signal and the digital Q signal, the analytic signal generator comprising:
            a first analytic signal generating unit configured to generate a first delayed signal and a first linear transformed signal according to the first filtered signal, the first set of analytic signals comprising the first delayed signal and the first linear transformed signal; and
            a second analytic signal generating unit configured to generate a second delayed signal and a second linear transformed signal according to the second filtered signal, the second set of analytic signals comprising the second delayed signal and the second linear transformed signal; and
        an arithmetic unit comprising:
            a first adder configured to generate the digital I signal according to the first delayed signal and the second linear transformed signal; and
            a second adder configured to generate the digital Q signal according to the second delayed signal and the first linear transformed signal.

2. The phase information extraction circuit of claim 1, wherein the arithmetic unit further comprises:
    an arithmetic adjustment unit configured to adjust polarities of the first linear transformed signal and the second linear transformed signal according to a detected velocity polarity so as to provide an adjusted first linear transformed signal and an adjusted second linear transformed signal to the first adder and the second adder respectively.

3. The phase information extraction circuit of claim 1, wherein the filter unit comprises:
    a first low-pass filter configured to filter the first mixed frequency signal to generate a first sampled signal, the first sampled signal be related to the first filtered signal; and
    a second low-pass filter configured to filter the second mixed frequency signal to generate a second sampled signal, the second sampled signal being related to the second filtered signal.

4. The phase information extraction circuit of claim 3, wherein the filter unit further comprises:
    a first high-pass filter configured to filter the first sampled signal to generate the first filtered signal; and
    a second high-pass filter configured to filter the second sampled signal to generate the second filtered signal.

5. The phase information extraction circuit of claim 1, wherein:
    the first analytic signal generating unit comprises:
        a first delay unit configured to delay the first filtered signal to generate the first delayed signal; and
        a first linear transformation unit configured to perform linear transformation on the first filtered signal to generate the first linear transformed signal; and
    the second analytic signal generating unit comprises:
        a second delay unit configured to delay the second filtered signal to generate the second delayed signal; and
        a second linear transformation unit configured to perform linear transformation on the second filtered signal to generate the second linear transformed signal.

6. The phase information extraction circuit of claim 5, wherein the first linear transformation unit comprises a first Hilbert transform unit and the second linear transformation unit comprises a second Hilbert transform unit.

7. A phase information extraction circuit for detecting movement of an object, comprising:
    a first mixer circuit configured to generate a second analog signal by mixing a carrier signal with a first analog signal, wherein the first analog signal is generated by a transmitted signal reflected by the object
    an analog-to-digital converter (ADC) coupled to the first mixer circuit and configured to generate a first digital signal according to the second analog signal;
    an in-phase quadrature (I/Q) signal generator coupled to the ADC and configured to generate a digital I signal and a digital Q signal according to the first digital signal; and
    a first phase acquisition unit configured to extract phase information according to the digital I signal and the digital Q signal, the phase information being related to the movement of the object; wherein:
    the I/Q signal generator comprises:
        a first mixer unit configured to mix a first intermediate frequency (IF) reference signal and a second intermediate frequency (IF) signal with the first digital signal for generating a first mixed frequency signal and a second mixed frequency signal respectively;

a filter unit configured to filter the first mixed frequency signal and the second mixed frequency signal at a frequency band to generate at least one filtered signal, and comprising a high-pass filter configured to filter a first sampled signal to generate a first filtered signal;

an analytic signal generator configured to generate at least one set of analytic signals according to the at least one filtered signal, the at least one set of analytic signals is related to the digital I signal and the digital Q signal, the analytic signal generator comprising an analytic signal generating unit configured to generate a delayed signal and a linear transformed signal according to the filtered signal, the set of analytic signals comprising the delayed signal and the linear transformed signal; and a phase generator configured to generate a phase value according to the first sampled signal and a second sampled signal, the first sampled signal being related to the first mixed frequency signal, the second sampled signal being related to the second mixed frequency signal; and the phase information extraction circuit further comprises a first IF reference signal generator configured to generate the first IF reference signal and the second IF reference signal related to an intermediate frequency according to the phase value.

8. The phase information extraction circuit of claim 7, wherein the phase generator comprises:

a direct current (DC) estimator configured to generate a DC I signal and a DC Q signal according to the first sampled signal and the second sampled signal respectively; and a second phase acquisition unit configured to extract the phase value according to the DC I signal and the DC Q signal.

9. The phase information extraction circuit of claim 7, wherein the filter unit further comprises:

a first low-pass filter configured to generate the first sampled signal by filtering the first mixed frequency signal; and a second low-pass filter configured to generate the second sampled signal by filtering the second mixed frequency signal.

10. The phase information extraction circuit of claim 7, wherein the I/Q signal generator further comprises an arithmetic unit comprising an arithmetic adjustment unit configured to adjust a polarity of the linear transformed signal according to a detected velocity polarity so as to adjust the digital Q signal.

11. The phase information extraction circuit of claim 7, wherein the analytic signal generating unit comprises:

a delay unit configured to generate the delayed signal by delaying the filtered signal; and a linear transformation unit configured to generate the linear transformed signal by performing linear transformation on the filtered signal.

12. The phase information extraction circuit of claim 11, wherein the linear transformation unit comprises a Hilbert transform unit.

13. The phase information extraction circuit of claim 7 further comprising:

a first IF reference signal generator configured to generate the first IF reference signal and the second IF reference signal; and a second IF reference signal generator configured to provide the carrier signal.

14. The phase information extraction circuit claim 13 further comprising a second mixer circuit configured to generate the transmitted signal by mixing the carrier signal with an IF signal having an intermediate frequency.

15. The phase information extraction circuit of claim 14 further comprising a digital-to-analog converter (DAC) configured to convert the IF signal from digital-to-analog.

16. A phase information extraction method for detecting movement of an object, comprising:

mixing a carrier signal with a first analog signal to generate a second analog signal, the first analog signal being generated by a transmitted signal reflected by the object;

generating a first digital signal according to the second analog signal;

generating a digital I signal and a digital Q signal according to the first digital signal; and generating phase information according to the digital I signal and the digital Q signal, the phase information being related to the movement of the object;

wherein generating the digital I signal and the digital Q signal according to the first digital signal comprises:

mixing a first intermediate frequency (IF) reference signal and a second intermediate frequency (IF) signal with the first digital signal to generate a first mixed frequency signal and a second mixed frequency signal;

filtering the first mixed frequency signal and the second mixed frequency signal at a frequency band to generate at least one filtered signal; and generating at least one set of analytic signals according to the at least one filtered signal, the at least one set of analytic signals being related to the digital I signal and the digital Q signal;

wherein:

the method further comprises:

generating the filtered signal by performing high-pass filtering on a first sampled signal;

generating a delayed signal and a linear transformed signal according to the filtered signal, the set of analytic signals comprising the delayed signal and the linear transformed signal;

generating a phase value according to the first sampled signal and the second sample signal, the first sampled signal being related to the first mixed frequency signal, the second sampled signal being related to the second mixed frequency signal; and generating the first IF reference signal and the second IF reference signal related to an intermediate frequency according to the phase value; or filtering the first mixed frequency signal and the second mixed frequency signal at the frequency band to generate the at least one filtered signal comprises filtering the first mixed frequency signal and the second mixed frequency signal at the frequency band to generate a first filtered signal and a second filtered signal respectively;

generating the at least one set of analytic signals according to the at least one filtered signal comprises generating a first set of analytic signals and a second set of analytic signals according to the first filtered signal and the second filtered signal respectively; and the method further comprises:

generating a first delayed signal and a first linear transformed signal according to the first filtered signal, the first set of analytic signals comprising the first delayed signal and the first linear transformed signal;

generating a second delayed signal and a second linear transformed signal according to the second filtered signal, the second set of analytic signals comprising the second delayed signal and the second linear transformed signal;

generating the digital I signal according to the first delayed signal and the second linear transformed signal; and generating the digital Q signal according to the first linear transformed signal and the second delayed signal.

17. The method of claim 16, further comprising generating the first sampled signal and the second sampled signal by performing low-pass filtering on the first mixed frequency signal and the second mixed frequency signal respectively.

* * * * *